(12) United States Patent
Neisen

(10) Patent No.: US 6,350,167 B1
(45) Date of Patent: Feb. 26, 2002

(54) INFLATABLE TRANSOM SEAL AND TECHNIQUES FOR ASSEMBLING SUCH SEAL IN A STERN DRIVE

(75) Inventor: Gerald F. Neisen, Rockport, TX (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/606,634

(22) Filed: Jun. 29, 2000

(51) Int. Cl.[7] ............................................. B63H 23/36
(52) U.S. Cl. ...................... 440/112; 440/111; 277/309; 277/312
(58) Field of Search ................. 440/111, 112; 220/232, 234; 277/309, 311, 561, 577, 630, 641, 646, 312, 345; 16/2.1, 2.2

(56) References Cited

U.S. PATENT DOCUMENTS

| | | | |
|---|---|---|---|
| 2,368,885 A | * | 2/1945 | Schmitter .................... 440/112 |
| 3,204,598 A | * | 9/1965 | Sharp ......................... 440/112 |
| 3,669,057 A | | 6/1972 | Shimanackas |
| 3,859,951 A | | 1/1975 | Woodfill ...................... 220/232 |
| 4,106,661 A | * | 8/1978 | Hunt .......................... 220/232 |
| 4,464,128 A | * | 8/1984 | Aso et al. .................... 440/112 |
| 4,478,585 A | | 10/1984 | Brandt et al. |
| 4,505,483 A | * | 3/1985 | Bent, Jr. ..................... 220/232 |
| 4,940,434 A | | 7/1990 | Kiesling |
| 5,220,696 A | * | 6/1993 | Dannenberg et al. ....... 220/234 |
| 5,411,272 A | * | 5/1995 | Pietsch et al. .............. 277/309 |
| 6,029,977 A | * | 2/2000 | Sym ............................ 277/312 |
| 6,048,493 A | * | 4/2000 | Melgaard et al. ........... 220/232 |

\* cited by examiner

Primary Examiner—S. Joseph Morano
Assistant Examiner—Lois A. Olson
(74) Attorney, Agent, or Firm—Timothy J. Ziolkowski; Cook & Franke SC

(57) ABSTRACT

A transom seal assembly for sealing an opening in a boat transom is provided. A propulsion system has a part thereof extending through the transom opening. The seal assembly comprises an inflatable seal between respective peripheries of the part and the transom opening to provide water-tight sealing relative to the interior of the boat even in the presence of a seal puncture condition.

42 Claims, 3 Drawing Sheets

INFLATABLE TRANSOM SEAL AND TECHNIQUES FOR ASSEMBLING SUCH SEAL IN A STERN DRIVE

BACKGROUND OF THE INVENTION

Boats which are propelled by propulsion systems, such as stern drive systems, commonly have an aperture in the transom through which extends a part of the stem drive system to enable transmission of power from an engine within the boat hull to a propulsion unit positioned rearwardly of the transom. Mounting of the stem drive system through the transom has required a seal to prevent entry of water through the aperture into the boat hull. Various arrangements have been employed in the past for providing a seal between the stem drive and the boat transom to prevent entry of water into the interior of the boat. Unfortunately, it is believed that each of such prior sealing arrangements may be somewhat vulnerable to single failures, that is, if the seal develops a single rupture, the boat could sink. Further, typical seals have involved various parts, such as trims, castings, and screws, and have been relatively burdensome to assemble.

Thus, it is desirable to provide a seal having structural redundancies that provide independent dual sealing, that is, a seal that would require separate failures of each of the structures that respectively provide independent sealing before the overall transom seal would be compromised. It is further desirable to provide a seal that may be readily assembled during manufacturing operations or during servicing or maintenance operations.

SUMMARY OF THE INVENTION

Generally speaking, the present invention in one aspect thereof fulfills the foregoing needs by providing a boat having a transom including an inner wall and an outer wall defining an opening therein. A stem drive system has a part thereof extending through the transom opening, and an inflatable seal is adhesively secured between respective peripheries of the part and the transom opening to provide water-tight sealing relative to the interior of the boat even in the presence of a seal puncture condition.

The present invention may further fulfill the foregoing needs in another aspect thereof by providing a transom seal assembly for sealing an opening in a boat transom. A propulsion system has a part thereof extending through the transom opening. The seal assembly comprises an inflatable seal between respective peripheries of the part and the transom opening to provide water-tight sealing relative to the interior of the boat even in the presence of a seal puncture condition. In one exemplary embodiment, the seal comprises a base and two anchor members circumferentially extending along the periphery of the transom opening and adhesively secured thereto.

In yet another aspect of the present invention, a method for sealing an opening in a boat transom is provided. The opening is configured to allow a part of a propulsion system to pass therethrough. The method allows for adhesively securing an inflatable seal between the part and the transom assembly. The method further allows for maintaining a water-tight seal relative to the interior of the boat even in the presence of a seal puncture condition.

Figure 1:
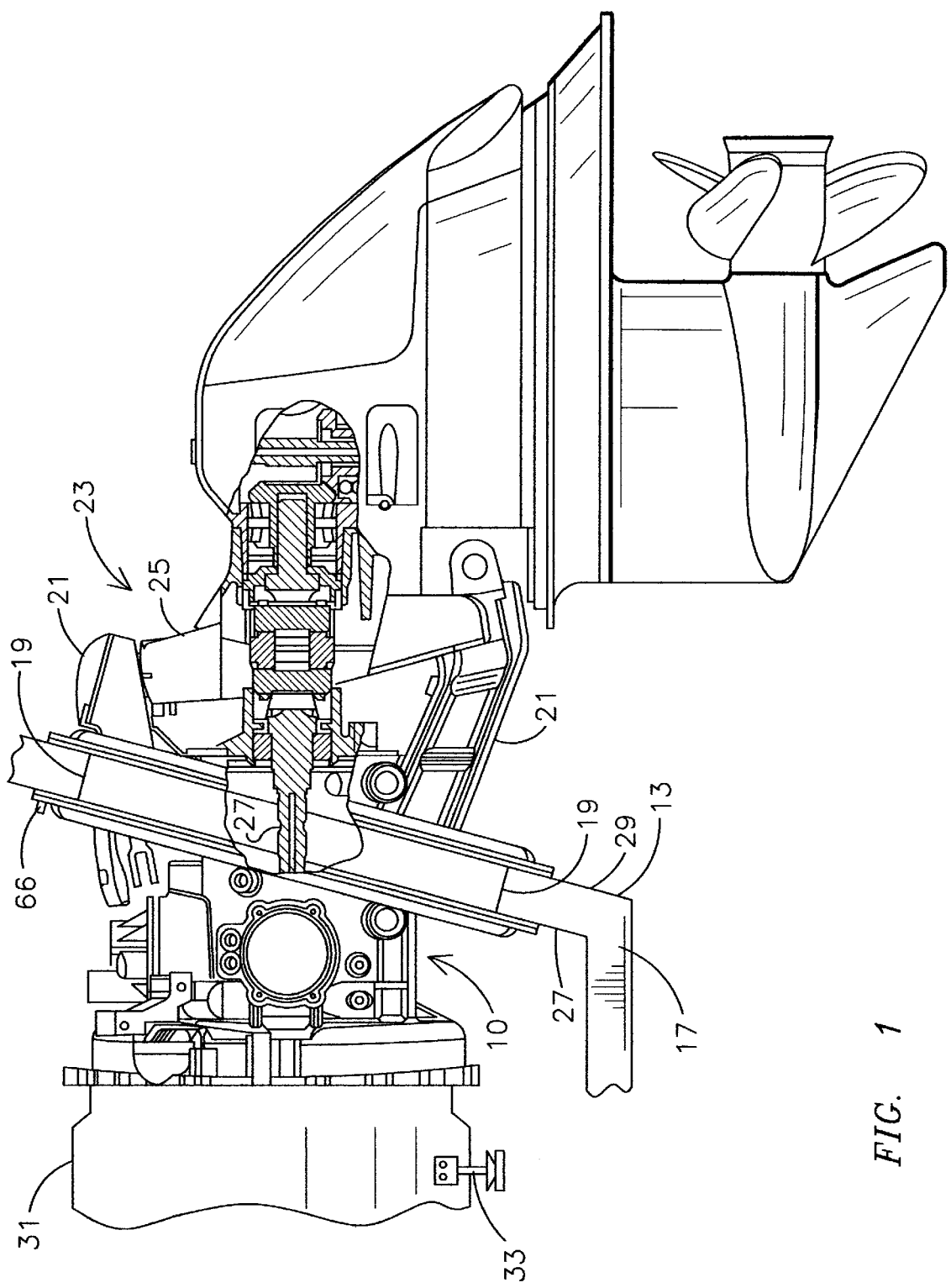
FIG. 1 is a fragmentary elevational side view and partly cross-sectional view of an exemplary marine propulsion that uses an inflatable transom seal assembly embodying one aspect of the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Shown in the drawings is an exemplary inflatable seal assembly 10 embodying various of the features of the present invention for sealing the transom 13 of a boat 17 against the entry of water through an aperture or opening 19 through which extends a part 21 of a stem drive system 23. More particularly, FIG. 1 shows a fragmentarily illustrated boat 17 having a hull with a transom 13 and including therein means defining an aperture 19 which may be oval but could have other shapes, such as circular, and which is circumscribed by wall boundaries 27 and 29 located on the inner and outer surfaces, respectively, of the transom 13. The boat 17 is adapted to be propelled in the water by stem drive system 23 including an engine 31 which is located in the boat hull forwardly of the transom 13 and which can be mounted on the boat hull by supporting means 33 independent of the sealing arrangement. Connected to the engine 31 or forming a portion thereof is a part 21 of the stem drive system 23 which extends through the aperture 19 to the rear of the transom 13 for connection to other components which extend into the water and provide both for propulsion and steering. The part 21 can be a housing for a gimbal unit 25 and/or a rearwardly extending drive shaft 27 or other components of the stern drive system and, by way of example, may have an oval-shaped outer periphery.

Figure 2:
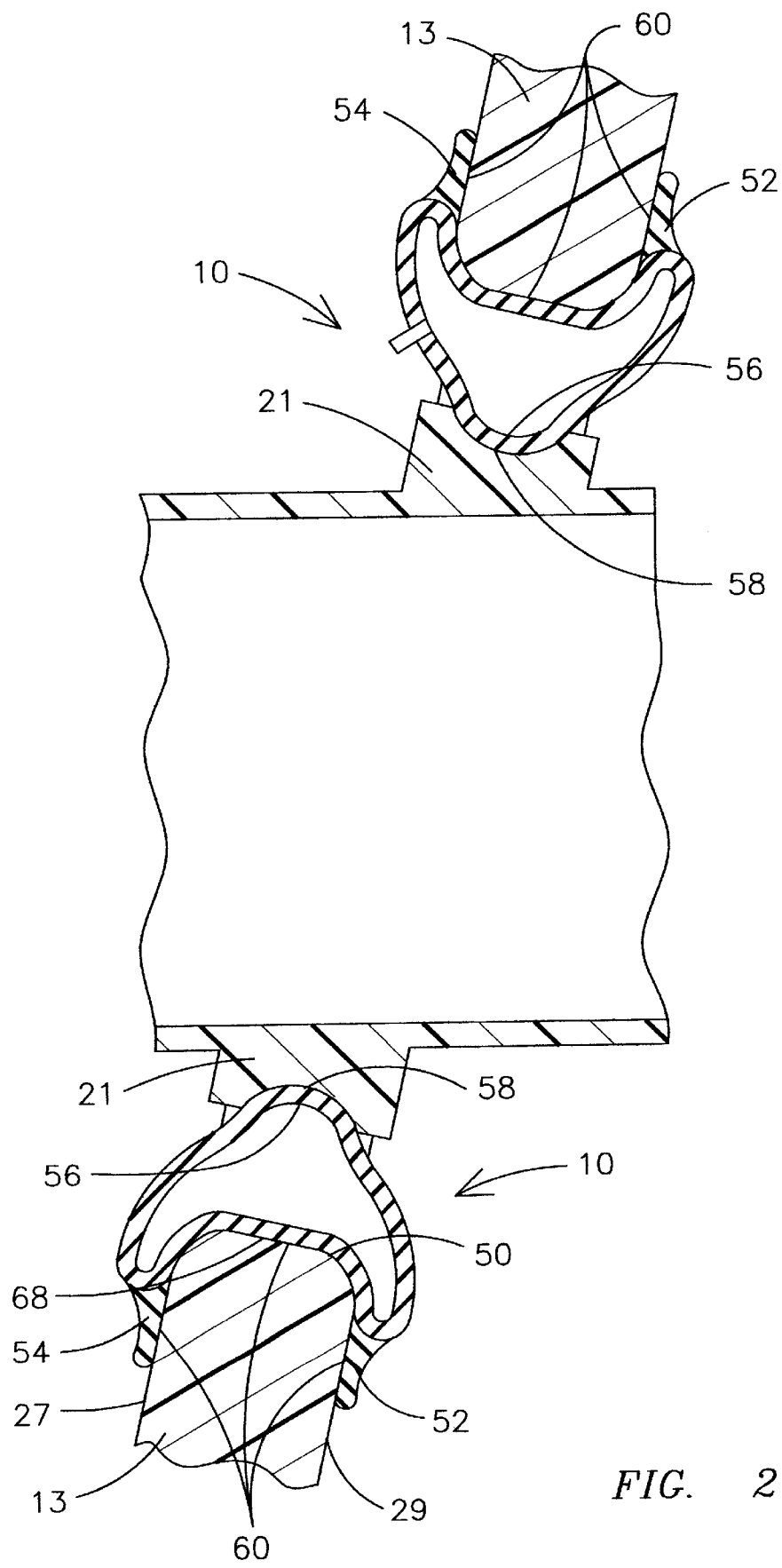
FIG. 2 in part illustrates a cross-sectional view of the seal assembly shown in FIG. 1.

As shown in FIG. 2, inflatable seal 10 comprises a circumferentially-extending base 50 and two anchor members 52 and 54 that define a generally U-shaped seal structure. Seal 10 further comprises an arcuate section 56 opposite base 50 configured to engage a corresponding groove 58 that circumferentially extends along the outer periphery of part 21.

Figure 3:
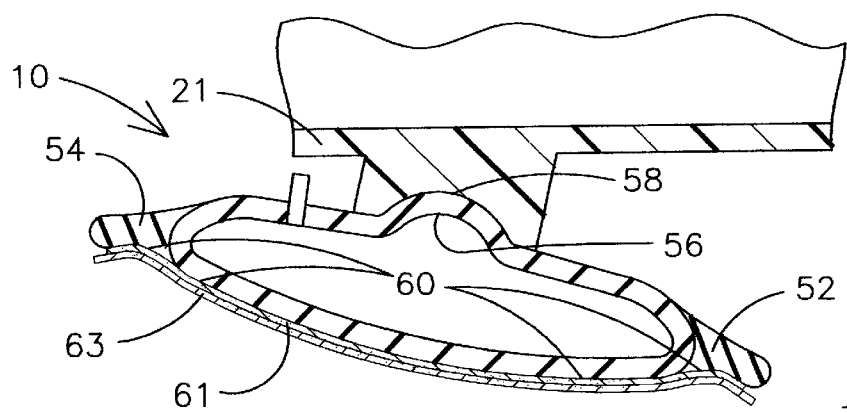
FIG. 3 is a fragmentary cross-sectional view of the seal assembly in a deflated state while undergoing assembly operations.

As shown in FIG. 3, in one exemplary embodiment, while in a deflated state, arcuate section 56 may be adhesively affixed to groove 58, using an adhesive, such as a glue, resin, cement, paste, putty, or any other substance capable of bonding two solids, such as rubber and metal, together by surface attachment in a marine environment. Prior to assembly operations, each respective seal surface, as represented by adhesive-containing surfaces 60, may be respectively applied a layer 61 of the adhesive. Surfaces 60 up to the time of assembly may be covered by a suitable adhesive-covering tape 63, which is readily removed at the time that such surfaces will be bonded to the periphery of the transom opening. By way of example, the removable adhesive-covering tape on surfaces 60 could of the type generally used for covering the gluing surfaces of pressure sensitive tape. In one exemplary embodiment, once each adhesive-containing surface 60, such as the respective inner surfaces of anchoring members 52 and 54 has been adhesively affixed to the respective inner and outer walls of the transom and the outer surface of base 50 has been adhesively affixed to the transom surface 68 that extends between the inner and outer walls of the transom, then a pressurizing fluid, such as air may be applied to a suitable inlet 66 to inflate seal 10.

Figure 4:
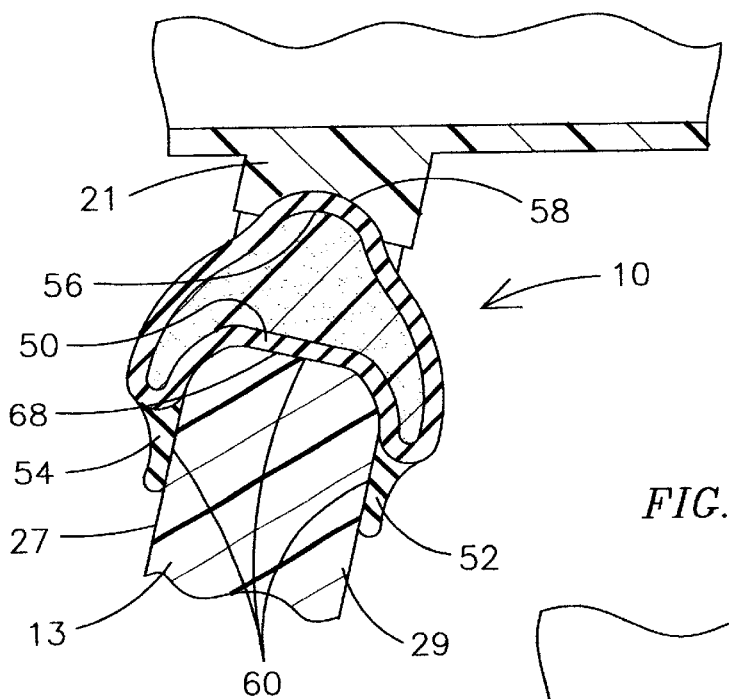
FIG. 4 is a fragmentary cross-sectional view of another embodiment of the seal assembly of the present invention that uses plastic foam in lieu of pressurized air.
Figure 5:
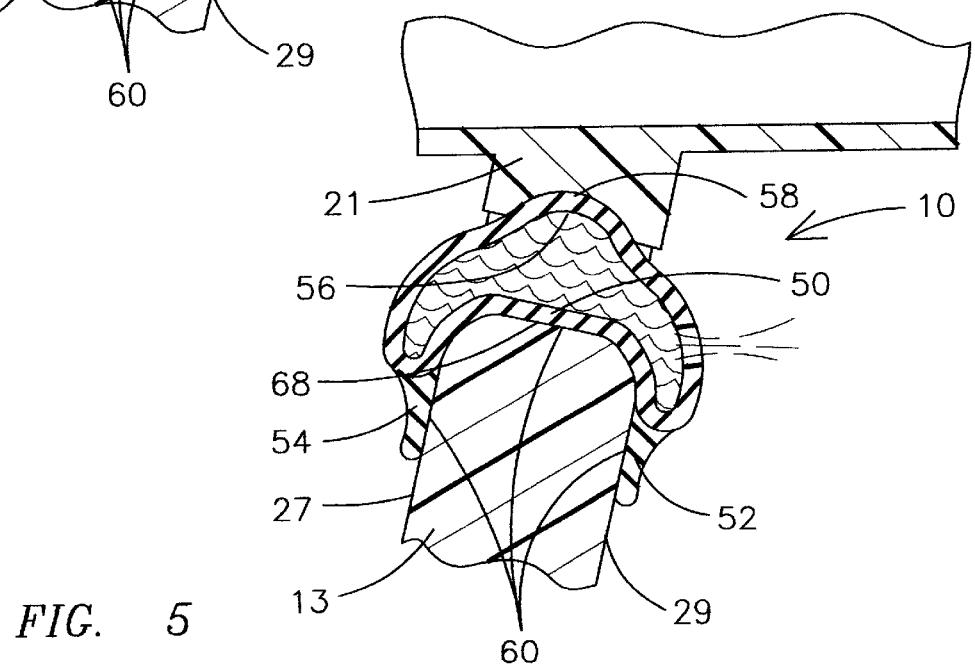
FIG. 5 is a fragmentary cross-sectional view of the seal assembly of the present invention that in another aspect thereof allows for maintaining a water-tight seal relative to the interior of the boat even in the presence of a puncture condition.

As shown in FIG. 4, in another exemplary embodiment, in lieu of using air, a suitable flexible cellular substance made up of synthetic or natural cellular cores with integral skins having relatively high strength, such as closed-cell flexible plastic foam, rubber foam or sponge, or other suitable high polymer may be injected in the seal. By way of example and not of limitation, the foaming action may occur in situ, i.e., using foamed-in-place plastic. In either case, either using air, plastic or rubber foam in the interior of the seal, regardless of whether a puncture were to develop in the seal, it is believed that the construction and assembly techniques of the present invention, would enable the seal to maintain a water-tight seal relative to the interior of the boat. For example, as shown in FIG. 5, notwithstanding of the presence of a puncture 70 on one side of the seal, adhesively affixed surfaces 60 would remain affixed to the respective peripheries of the part and the transom and would prevent the seal to slip relative to the transom opening. Thus, any water entering through puncture 70 would be contained within the interior of the seal and would not pass into the interior of the boat.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A boat having a transom including an inner wall and an outer wall defining an opening therein, a stem drive system having a part thereof extending through the transom opening, and an inflatable seal adhesively secured between respective peripheries of the part and the transom opening to provide water-tight sealing relative to the interior of the boat even in the presence of a seal puncture condition.

2. The boat of claim 1 wherein the seal comprises a base and two anchor members circumferentially extending along the periphery of the transom opening.

3. The boat of claim 2 wherein the base and two anchor members define a generally U-shaped seal relative to the periphery of the transom opening.

4. The boat of claim 2 wherein the seal further comprises an arcuate section circumferentially extending opposite the seal base.

5. The boat of claim 4 wherein the part extending through the transom has a groove configured to receive the circumferentially extending arcuate section.

6. The boat of claim 5 wherein the grove and the arcuate section are adhesively affixed to one another.

7. The boat of claim 3 wherein the seal base and respective anchor members are adhesively affixed to the periphery of the transom opening.

8. The boat of claim 1 wherein the seal includes an inlet for receiving a pressurizing fluid.

9. The boat of claim 8 wherein the pressurizing fluid is air.

10. The boat of claim 1 wherein the seal includes an inlet for receiving flexible plastic foam.

11. The boat of claim 10 wherein the foam comprises a closed-cell foam.

12. The boat of claim 1 wherein the seal includes an inlet for receiving rubber foam.

13. The boat of claim of claim 4 wherein one of the two anchor members is adhesively affixed to the outer wall of the transom and the other one of the two anchor members is adhesively affixed to the inner wall of the transom.

14. The boat of claim 4 wherein the seal base is adhesively affixed to the transom surface that traverses between the inner and outer walls of the transom.

15. A transom seal assembly for sealing an opening in a boat transom, a propulsion system having a part thereof extending through the transom opening, the seal assembly comprising an inflatable seal between respective peripheries of the part and the transom opening to provide water-tight sealing relative to the interior of the boat even in the presence of a seal puncture condition, the seal comprising a base and two anchor members circumferentially extending along the periphery of the transom opening and adhesively secured thereto.

16. The transom seal assembly of claim 15 wherein the seal further comprises an arcuate section circumferentially extending opposite the seal base, said arcuate section adhesively secured to a corresponding groove in the part.

17. The transom assembly of claim 16 wherein the seal includes an inlet for receiving a pressurizing fluid.

18. The transom assembly of claim 17 wherein the pressurizing fluid is air.

19. The transom assembly of claim 16 wherein the seal includes an inlet for receiving flexible plastic foam.

20. The transom assembly of claim 19 wherein the foam comprises a closed-cell foam.

21. The transom assembly of claim 16 wherein the seal includes an inlet for receiving rubber foam.

22. A method for sealing an opening in a boat transom, the opening being configured to allow a part of a propulsion system to pass therethrough, the method comprising:
   adhesively securing an inflatable seal between the part and the transom assembly; and
   maintaining a water-tight seal relative to the interior of the boat even in the presence of a seal puncture condition.

23. The method for sealing of claim 22 wherein the adhesively securing step comprises adhesively securing an arcuate section of the seal to a corresponding groove in the part.

24. The method for sealing of claim 23 wherein the arcuate section is adhesively secured to the corresponding groove while the seal is in deflated state.

25. The method for sealing of claim 24 wherein the adhesively securing step further comprises adhesively securing a seal base opposite the arcuate section to a transom surface that traverses between respective inner and outer walls of the transom.

26. The method for sealing of claim 25 wherein the adhesively securing step further comprises adhesively securing respective seal anchor members to the inner and outer walls of the transom.

27. The method for sealing of claim 22 further comprising applying a pressurizing fluid into the seal.

28. The method for sealing of claim 27 wherein the pressurizing fluid is air.

29. The method for sealing of claim 22 further comprising injecting flexible plastic foam into the seal.

30. The method for sealing of claim 29 wherein the foam comprises a closed-cell foam.

31. The method for sealing of claim 22 further comprising injecting rubber foam into the seal.

32. An assembly for sealing an opening in a boat transom, the opening being configured to allow a part of a propulsion system to pass therethrough, the assembly comprising:

means for adhesively securing an inflatable seal between the part and the transom assembly; and means for maintaining a water-tight seal relative to the interior of the boat even in the presence of a seal puncture condition.

33. The sealing assembly of claim 32 wherein the adhesively securing means comprises means for adhesively securing an arcuate section of the seal to a corresponding groove in the part.

34. The sealing assembly of claim 33 wherein the arcuate section is adhesively secured to the corresponding groove while the seal is in a deflated state.

35. The sealing assembly of claim 34 wherein the adhesively securing means further comprises means for adhesively securing a seal base opposite the arcuate section to a transom surface that traverses between respective inner and outer walls of the transom.

36. The sealing assembly of claim 35 wherein the adhesively securing means further comprises means for adhesively securing respective seal anchor members to the inner and outer walls of the transom.

37. The sealing assembly of claim 32 further comprising means for applying a pressurizing fluid into the seal.

38. The sealing assembly of claim 37 wherein the pressurizing fluid is air.

39. The sealing assembly of claim 32 further comprising means for injecting flexible plastic foam into the seal.

40. The sealing assembly of claim 39 wherein the foam comprises a closed-cell foam.

41. The sealing assembly of claim 32 further comprising means for injecting rubber foam into the seal.

42. The transom seal assembly of claim 15 wherein the inflatable seal in adhesively secured between the respective peripheries of the part and the transom opening and configured to provide watertight sealing relative to the interior of the boat during deflation thereof.

* * * * *

UNITED STATES PATENT AND TRADEMARK OFFICE
CERTIFICATE OF CORRECTION

PATENT NO. : 6,350,167 B1
DATED : February 26, 2002
INVENTOR(S) : Neisen, Gerald F.

It is certified that error appears in the above-identified patent and that said Letters Patent is hereby corrected as shown below:

Column 1,
Lines 8, 11, 15 and 37, delete the word "stem" and substitute therefor -- stern --;

Column 2,
Lines 34, 41 and 46, delete the word "stem" and substitute therefor -- stern --;

Column 3,
Line 48, delete the word "stem" and substitute therefor -- stern --;

Signed and Sealed this

Twentieth Day of August, 2002

Attest:

JAMES E. ROGAN
Attesting Officer  Director of the United States Patent and Trademark Office